United States Patent
Möree et al.

[11] 4,210,461
[45] Jul. 1, 1980

[54] METHOD FOR RECOVERING HEAT IN A VAPOR DEGREASING APPARATUS

[75] Inventors: Hans G. E. Möree, Surte; Helmut Grunewald, Gothenburg, both of Sweden

[73] Assignee: Elecktrokemiska AB, Fack, Sweden

[21] Appl. No.: 920,281

[22] Filed: Jun. 29, 1978

Related U.S. Application Data

[63] Continuation of Ser. No. 691,075, Jun. 14, 1976, abandoned.

[30] Foreign Application Priority Data

Jun. 2, 1975 [SE] Sweden .............................. 75062513
Dec. 15, 1975 [SE] Sweden .............................. 75141093

[51] Int. Cl.² .............................................. B08B 5/00
[52] U.S. Cl. ........................................ 134/11; 134/31; 134/40
[58] Field of Search ............................. 134/11, 31, 40; 202/168, 169

[56] References Cited

U.S. PATENT DOCUMENTS

| | | | |
|---|---|---|---|
| 2,816,065 | 12/1957 | Legler | 202/168 X |
| 3,070,463 | 12/1962 | Barday | 134/11 |
| 3,460,990 | 8/1969 | Barday | 134/11 X |
| 4,055,196 | 10/1977 | Kearney | 202/169 X |

*Primary Examiner*—Marc L. Caroff
*Attorney, Agent, or Firm*—Laff, Whitesel & Rockman

[57] ABSTRACT

Heat is supplied to the solvent bath of a vapor degreasing apparatus by a heat pump system to maintain the solvent bath in a constantly boiling state and generate a zone of solvent vapor above the bath. The solvent vapor is condensed on a cooling coil through which the heat-carrying medium of the heat pump system is being circulated, thereby transferring heat from the solvent vapors to the heat-carrying medium. Thereafter, the heat-carrying medium is compressed and discharged directly into the solvent bath while a portion of the condensed solvent vapors is diverted into the cooling coil.

3 Claims, 2 Drawing Figures

METHOD FOR RECOVERING HEAT IN A VAPOR DEGREASING APPARATUS

This is a continuation of application Ser. No. 691,075, filed June 14, 1976, now abandoned.

This invention relates to a method by which a degreasing apparatus supplies heat to its solvent bath to such an extent that the bath will be constantly boiling. The method involves generating a zone of solvent steam above the bath to be utilized for a steam phase cleaning of the goods to be degreased; a cooling coil is inserted in the upper part of which zone, for condensing the steam. The condensate if brought back from the cooling coil to the solvent bath where it is to be utilized for liquid cleaning the goods to be degreased.

It is an object of the invention to considerably reduce the costs for the operation of such a degreasing apparatus without introducing consequences in the form of complications of the method or a substantial increase of costs for extra equipment.

According to the invention the heat transferred from the steam to the cooling coil is supplied to the circulating heat carrying medium of a heat pump. The medium is vaporized and the steam is thereafter compressed and supplied to the solvent bath.

Figure 1:
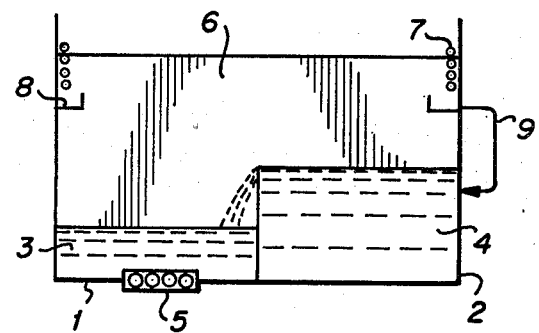
Figure 2:
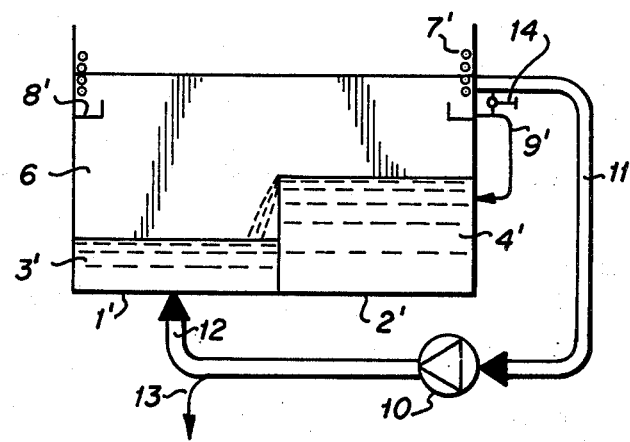

The above features of the invention will appear more fully hereinafter from the following detailed description when taken in conjunction with the accompanying drawing, in which FIG. 1 shows entirely schematically a conventional method for using a degreasing apparatus, and FIG. 2 shows, also entirely schematically, the method according to the invention.

In the conventional method, according to FIG. 1, the degreasing apparatus comprises two liquid compartments 1 and 2 containing solvent baths 3 and 4 respectively. The bottom of the liquid compartment 1 containing a heater 5, which is supplied with a heated fluid (such as steam) or electric current to an extent, that the solvent bath 3 will be constantly boiling. The resultant solvent vapor as steam generated thereby fills out the space above the two baths, 3 and 4 in a zone designated 6. In the upper part of this zone is inserted the cooling coil 7 of a cooler. This coil 7 extends around the inner sides of the walls of the degreasing tank. When the saturated steam hits this cooling coil 7 a condensation takes place and the condensate is collected in a channel 8 extending around the inner sides of the tank walls. The condensate is conducted therefrom to the liquid compartment 2, as is shown by the arrow 9. The excess liquid there overflows lower into the lower liquid compartment 1. In this way, an oil separation is provided in last-mentioned compartment 1.

From the degreasing apparatus some of the solvent mingles with the air above the steam zone 6. The content of the solvent in this air depends on the steam pressure of the solvent, at the temperature of the cooling coil. Thus, the loss of solvent is less at lower temperatures of the cooling coil.

The cold temperature in cooling coil 7 is usually caused by means of cooling water, but sometimes it may be means of a refrigerating machine, for enabling lower cooling coil temperatures and lower solvent losses.

The amount of heat which the apparatus requires varies from one apparatus to another depending on the quantity of goods to be degreased per unit of time, the amount of grease on the goods, and the solvent used. Power utilization in the order of 10 KW–100 KW are usual.

The quantity of cooling water required for the condensation of the solvent varies in the same way between 1 m$^3$ and 10 m$^3$ per hour.

The steam which hits the cooling coil 7 of course heats this coil and, in the conventional apparatus just described, this heat leaves the area 6 along with the return of the cooling water.

According to the invention, the heat from the cooling coil is utilized to save energy required for the heating of the bath, which will be described more detailed in connection with FIG. 2, in which corresponding components have been given corresponding prime numerals.

In FIG. 2, a cooling machine 10 is used and arranged so that the cooling medium flows through the heating coils in the bottom of the degreasing apparatus and through the cooling coils 7 in its top. Thus the invention is indirectly arranged so that the energy is transferred through another medium. The cooling machine is preferably dimensioned to maintain a relatively low cooling coil temperature, resulting, as mentioned above, in low solvent losses.

The cooling machine according to the invention, consists of a heat pump 10. A heat pump is a device for transferring heat energy from a low-temperature locality to a high-temperature locality by mechanical means involving the compression and expansion of a fluid (as in mechanical refrigeration). The heat from the cooling coil 7' is conducted to this pump, as is shown by the arrow 11. This can be achieved in such a way that the coil 7' lies directly in the heat carrying medium of the pump. This medium consists of a liquid which is easily vaporized and circulated in a closed circuit in the heat pump. It is also possible to exchange the heat from the cooling coil 7' to the circulating medium. Thereby, the medium is vaporized. This steam is mechanically compressed by an electrically operated compressor or through a steam jet pump operated which may be by high pressure steam.

The compressed steam, which now has an increased saturation temperature, is supplied to the liquid compartment 1', as is shown by the arrow 12. This supply may be transmitted to compartment 1 either directly or through a heat exchanger, thereby condensing the steam.

By inserting a pressure regulating valve 14 in a line connecting the line 9' and the cooling coil 7', the solvent can be utilized as a cooling medium to be vaporized on the suction side of the heat pump. In greater detail, when the proper solvents are used, they may serve the dual function of both a solvent and a heat-carrying medium. The solvent is condensed by the temperature of cooling coil 7' and the condensate is collected in the channel 8'. The collected condensate is returned, in part, through the valve 14 to the suction side of heat pump 10, via a conduit represented by the arrow 11. The pump compresses the condensate and returns it, as a hot fluid, to the solvent bath 3'. The portion of the condensate collected in channel 8' which is not drawn through valve 14 is returned directly to the liquid solvent bath 3' via conduit 9. Thus, the solvent and heat-carrying medium may be circulated in two separate circuits.

According to a modification, the heat carrying medium may circulate in a closed system. Then, the vaporizing takes place in the cooling coil 7' and the condensation takes place through a heat exchange with the solvent in the liquid compartment 1'.

For its operation, the heat pump requires a certain amount extra energy to be supplied from outside, of course, a corresponding amount of energy has to be cooled away in another way than in the cooling coil (is indicated through the arrow 13). When the apparatus is fed with goods to be degreased these goods will adopt this heat quantity. During idle-running periods this heat may preferably be utilized for other purposes, e.g. for heating the premises.

The efficiency of the heat pump (i.e. the relationship between transported energy and the energy supplied to the pump), to a great deal depends on the temperature difference between the cold place from where the energy is taken and the hot place to which it is delivered. In order to get the best possible efficiency, a low-boiling solvent is preferred (boiling point below 50° C.), in which case the simpliest form of a heat pump can be used. Such a solvent is methyldichloride, or other alkylated hydrocarbons and/or mixtures of such solvents, an example of such others are fluoric hydrocarbons and fluorine-bromine-hydrogen chlorides.

The usual solvent in Sweden is trichloroethylene. However, in USA is trichloroethane is frequently used. These two solvents have a boiling point of 87° C. and 74° C. respectively.

An example of the saving which is possible by using the method according to the invention is given below. Thereby, it is assumed that a 100 kW trichloroethylene degreasing apparatus is used 16 hours per day, 200 days per year and that the following electric energy rates and water rates are paid:

Electric energy=0.15 Skr/kWh (Swedish Kroner)
Water=1.80 Skr/m$^3$

|  | Trichloroethylene convention. | Trichloroethane convention. | Methyldichloride convention. | Methyldichloride according invention |
|---|---|---|---|---|
| Supplied heat power | 100 kW | 80 kW | 30 kW | 10 kW |
| Cooling water need | 1;8 m$^3$/h | 1;8 m$^3$/h | 3 m$^3$/h | 0 m$^3$/h |
| Operating costs/year, about Skr | 58,000 | 48,000 | 82,000 | 5,000 |

From the above, it is evident that the extra cost for a heat pump is paid in a very short time which can be estimated to lie under the half-year.

We claim:

1. A method of heat control in a solvent vapor degreasing apparatus, said apparatus comprising a tank containing a liquid solvent bath in the bottom thereof, and with a solvent vapor zone for degreasing objects above said liquid solvent bath, said method comprising the steps of:

a. heating the bottom of said tank for heating said liquid to be continuously at the boiling point, thereby generating vapor from said liquid solvent bath;
  b. cooling a region defined by a cooling coil at least partially surrounding the inside of said tank at a level above said solvent vapor zone;
  c. recovering the vapor in a liquid form from said cooling region and returning a first portion of the recovered liquid to said liquid solvent bath and diverting a second portion of the recovered liquid into said cooling coil of a heat pump means;
  d. supplying heat absorbed by said cooling coil in said cooling region from said solvent vapor to a circulating heat-carrying medium of a system including said heat pump means, in which the medium is vaporized and thereafter is compressed and discharging the vaporized and compressed medium at high temperature and pressure directly into the liquid solvent bath, said heat-carrying medium including said second portion of said recovered liquid solvent; and
  e. supplying extra energy from outside the system including the heat pump means for operation of said system and cooling away excess heat outside the degreasing apparatus for balancing said system.

2. A method according to claim 1, wherein step c. comprises cooling the region above the level of said solvent vapor zone by vaporizing said solvent heat-carrying medium on the suction side of said heat pump means and step a. comprises heating the bottom of said tank by condensing the solvent heat-carrying medium on the output side of said pump.

3. A method according to claim 1 or 2 including the added step of selecting the solvent from one or more low-boiling solvents taken from the class consisting of methyldichloride, or other alkylated fluoric hydrocarbons and/or other mixtures of such solvents.

* * * * *

UNITED STATES PATENT AND TRADEMARK OFFICE
CERTIFICATE OF CORRECTION

PATENT NO. : 4,210,461
DATED : July 1, 1980
INVENTOR(S) : H. Moree et al.

It is certified that error appears in the above—identified patent and that said Letters Patent is hereby corrected as shown below:

Col. 1, line 13, delete tne comma after "zone"
Col. 1, line 14, "if" should read --is--
Col. 1, line 42, "as" should read --or--
Col. 1, line 43, delete the comma after "baths"
Col. 3, line 43, "1;8" should read --1.8-- (both occurrences)
Col. 3, line 44, "82,000" should read --32,000--.

Signed and Sealed this

Second Day of December 1980

[SEAL]

Attest:

SIDNEY A. DIAMOND

Attesting Officer

Commissioner of Patents and Trademarks